(12) United States Patent
Whiteman

(10) Patent No.: US 6,235,344 B1
(45) Date of Patent: May 22, 2001

(54) METHOD OF IMPROVING AN ADHESIVE ARTICLE

(75) Inventor: John David Whiteman, Churchville, PA (US)

(73) Assignee: Rohm and Haas Company, Philadelphia, PA (US)

( * ) Notice: Subject to any disclaimer, the term of this patent is extended or adjusted under 35 U.S.C. 154(b) by 0 days.

(21) Appl. No.: 09/480,899

(22) Filed: Jan. 11, 2000

Related U.S. Application Data

(60) Provisional application No. 60/118,753, filed on Feb. 5, 1999.

(51) Int. Cl.$^7$ .......................................................... B05D 5/10
(52) U.S. Cl. ........................ 427/180; 427/208.4; 427/288
(58) Field of Search .................................... 427/180, 201, 427/207.1, 208.4, 285, 288

(56) References Cited

U.S. PATENT DOCUMENTS 5,147,938 * 9/1992 Kuller .
5,494,971 * 2/1996 Blankenship .

* cited by examiner

*Primary Examiner*—Fred J. Parker
(74) *Attorney, Agent, or Firm*—Stephen T. Falk

(57) ABSTRACT

A method of improving an adhesive article, such tape, a label or repositionable paper, containing a paper facestock layer and an adhesive layer is disclosed. The adhesive layer contains a pressure sensitive adhesive and voided latex particles. The incorporation of the voided latex particles into the adhesive layer provides opacity and improves shear strength, without unacceptably compromising the tack and peel adhesion properties of the adhesive layer and without causing wear to processing equipment relative to conventional fillers.

10 Claims, No Drawings

METHOD OF IMPROVING AN ADHESIVE ARTICLE

This application claims the benefit of U.S. Provisional Application No. 60/118,753, filed Feb. 5, 1999.

This invention relates to a method of improving an adhesive article containing at least one paper facestock layer and at least one adhesive layer. More particularly, this invention relates to a method of improving an adhesive article containing at least one paper facestock layer and at least one adhesive layer, wherein the adhesive layer contains a pressure sensitive adhesive and voided latex particles.

A variety of pressure sensitive adhesives, hereinafter referred to as "PSA," are available for use, inter alia in tape and label applications where the transparency of the PSA is generally a desirable property, especially in those applications using a transparent facestock. If the PSA is transparent, then it does not interfere with viewing the facestock or substrate to which the adhesive article is attached nor does it otherwise detract aesthetically from the final product. In applications where a transparent PSA cannot be achieved or where the color of the PSA is not stable, formulators generally add fillers, such as colored clays and inexpensive pigments, to uniformly color the PSA.

Paper tapes (such as masking tapes), paper labels and repositionable paper are made using paper as the facestock layer with at least one PSA layer applied to at least a portion of the paper facestock layer. If the paper utilized is lightweight or inferior or if the PSA bleeds through the paper facestock layer, the clarity and appearance of the printing on the facestock of the paper article is diminished. In addition, if the substrate onto which the paper article is applied shows through the facestock the appearance of the paper article is damaged. Thus, it would be desirable to find a solution to this appearance problem that does not compromise the adhesive properties of the PSA, including tack, peel adhesion and shear strength, to an unacceptable level and does not cause wear to the processing equipment, such as die cutters and knives used to slit tape rolls or guillotine label sheet stock.

One possible solution is to add an opacifying agent, such as titanium dioxide, calcium carbonate, calcined clay, kaolin clay, zinc oxide, hollow glass beads, voided latex particles, to the paper facestock layer either in the paper making process or as a coating layer on the paper facestock. One possible disadvantage of this solution to the tape or label manufacturer is that the manufacturer may not be able to control how the opacifying agent is provided (type, level, cost, etc.) on the paper by the paper manufacturer or converter. Another possible disadvantage, especially in repositionable paper applications, is that adding the opacifying agent to the paper facestock layer would be wasteful and costly if the cause of the poor appearance were associated only with the bleed-through of the adhesive layer and such adhesive layer were only applied to a small portion of the paper facestock layer.

Applicant has found an advantage in adding a specific opacifying agent to the adhesive layer rather than to the paper facestock layer, especially for those applications where the manufacturer wants control of the aesthetic properties of the adhesive article or where the adhesive layer will be applied to only a portion of the paper facestock layer. Applicant has found a solution to the opacity problem that actually improves the shear strength of the adhesive layer without unacceptably compromising the tack and peel adhesion of the adhesive layer. Applicant's solution also reduces the level of wear, relative to conventional opacifying agents, such as titanium dioxide, calcium carbonate, calcined clay, kaolin clay and zinc oxide (all having Moh hardness of 2.0–6.5), to processing equipment typically used to make paper tape, paper labels and repositionable paper.

U.S. Pat. No. 5,045,569 discloses hollow, polymeric, acrylate, infusible, inherently tacky, solvent-insoluble, solvent-dispersible, elastomeric PSA microspheres having an average diameter of at least one 1 $\mu$m (1,000 nm) and preferably multiple voids. Because of the relatively low Tg of the hollow microspheres of U.S. Pat. No. 5,045,569 (less than –20° C.), the hollow microspheres themselves may be used as an adhesive. Consequently, these hollow microspheres are malleable and would collapse and thus would not contribute to the opacity of the adhesive layer.

STATEMENT OF THE INVENTION

The invention is a method of improving an adhesive article, including the steps of:

a. providing at least one paper facestock layer; and b. applying at least one adhesive layer to at least a portion of the paper facestock layer, wherein the adhesive layer, contains at least one pressure sensitive adhesive. The voided latex particles are incorporated at a level of 1% by weight solids to 80% by weight solids, based on the total weight of the adhesive layer prior to drying, of voided latex particles into the adhesive layer prior to application of the adhesive layer to the paper facestock layer. The voided latex particles useful in the method of the invention have a particle size diameter of 100 nm to 2,000 nm, a void fraction of 10% to 75%, and a glass transition temperature of at least 20° C.

As used herein, the term "facestock" shall mean the paper backing layer in an adhesive article. In paper labels, the facestock is the paper portion of the label and does not include any release liner. In paper tapes, such as masking tapes, the facestock is the paper portion of the tape.

As used herein, the term "repositionable paper" shall mean paper having applied thereto an adhesive that permits positional adjustments after application to a substrate, yet displays high peel adhesion and shear strength, and displays clean removal from most substrates.

The paper facestock layer of the invention may be any type of paper or other cellulosic material conventionally used in making adhesive articles (tape, label and repositionable paper). The paper layer may optionally be coated with an opacifying agent, including voided latex particles useful in the method of the invention, in addition to providing the voided latex particles in the adhesive layer. The thickness of the paper facestock layer is determined by the final application (tape, label, repositionable paper) and by manufacturing conditions. The paper facestock layer may be colored. By incorporation of the voided latex particles into the adhesive layer, it may actually be possible to use a lower weight or thinner layer of paper facestock.

The adhesive layer of the invention minimally contains at least one PSA and voided latex particles. Pressure sensitive adhesives useful in the invention include any conventional PSA, including without limitation, hot melt adhesives, solvent-based solution rubber adhesives, styrene-butadiene rubber emulsion adhesives and acrylic adhesives. In addition to the polymer component, the adhesive formulation may also contain conventional additives, including without limitation, tackifiers, fillers, wetting agents, surfactants, coalescents, rheology modifiers, thickeners, preservatives and defoamers.

The crux of the invention is the incorporation of voided latex particles into the adhesive layer. The voided latex particles may be incorporated directly into the adhesive formulation at a level of 1% by weight solids to 80% by weight solids, based on the weight solids of the PSA. Preferably, the voided latex particles may be incorporated at a level of 5% by weight solids to 50% by weight solids, based on the weight solids of the PSA. Most preferably, the voided latex particles may be incorporated at a level of 10% by weight solids to 25% by weight solids, based on the weight solids of the PSA. If the voided latex particles are incorporated at a level of less than 1% by weight solids, then the voided latex particles will not be able to provide the desired opacity to the adhesive article. If the voided latex particles are incorporated at a level of greater than 80% by weight solids, then the voided latex particles will unacceptably compromise the adhesive properties, especially tack and peel of the adhesive layer.

The voided latex particles useful in the method of the invention have a particle size diameter of 100 nm to 2,000 nm and a void fraction of 10% to 75%. Preferably, the voided latex particles useful in the method of the invention have a particle size of 500 nm to 1,100 nm. Voided latex particles having a particle size diameter less than 100 nm or greater than 2,000 nm do not provide adequate opacity to the adhesive layer. Preferably, the voided latex particles useful in the method of the invention have a single void. The particle size and void fraction of the voided latex particles may be determined by conventional techniques known, including microscopy and the Brookhaven Model BI-90 Particle Sizer supplied by Brookhaven Instruments Corporation, Holtsville, N.Y., which employs a quasi-elastic light scattering technique to measure the size of the particles.

The voided latex particles useful in the method of the invention have a glass transition temperature, as measured by differential scanning calorimetry at a rate of 20° C. of at least 20° C. and, more preferably, of at least 50° C. A higher glass transition temperature contributes to a harder particle that is less likely to collapse and thereby be unable to contribute to opacity.

The voided latex particles useful in the invention may be prepared by conventional polymerization processes known in the art, such as those disclosed in U.S. Pat. Nos. 3,784,391; 4,798,691; 4,908,271; 4,972,000; and Japanese Patent Applications 60/223,873; 61/62510; 61/66710; 61/86941; 62/127336; 62/156387; 01/185311; 02/140272. Preferably, the voided latex particles are prepared according to U.S. Pat. Nos. 4,427,836; 4,469,825; 4,594,363; 4,880,842 and 5,494,971.

To incorporate the voided latex particles into the adhesive layer, they may be added to the PSA and other adhesive components and mixed thoroughly and evenly to disperse the voided latex particles throughout the formulation. The adhesive formulation may be conventionally applied onto the paper facestock layer by direct or transfer coating.

EXAMPLES

Example 1

Preparation of Adhesive Formulations

Adhesive formulations useful in the method of the invention were prepared using an acrylic PSA and the opacifying agents shown in Table 1:

TABLE 1

| Opacifying Agent | Particle Size | Void Fraction | Tg |
|---|---|---|---|
| ROPAQUE HP-1055 hollow sphere pigment (26.5% solids)[1] | approximately 1,000 nm | 55% | >50° C. |
| ROPAQUE HP-543 hollow sphere pigment (30.0% solids)[1] | approximately 500 nm | 43% | >50° C. |

[1]Available from the Rohm and Haas Company, Philadelphia, PA.

CARBILUX™ CCLI calcium carbonate slurry, available from ECC International Inc., Roswell, Ga., was used as a comparative opacifying agent. The opacifying agents were mixed with acrylic PSA with a mechanical stirrer for 30 minutes and equilibrated for 12 hours.

Table 2 shows the formulations for the control (two different acrylic PSAs), comparative calcium carbonate at 10% and 15% levels (weight solids/weight solids PSA), and two different types of hollow latex particles, each at 10% and 15% levels (weight solids/weight solids PSA).

TABLE 2

| | Adhesive Formulation | | | | | | | |
|---|---|---|---|---|---|---|---|---|
| | 1 Control | 2 Control | 3a Comparative | 3b Comparative | 4a | 4b | 5a | 5b |
| Acrylic Adhesive 1 | 100.0 g | — | — | — | — | — | — | — |
| Acrylic Adhesive 2 | — | 100.0 g | 100.0 g | 100.0 g | 100.0 g | 100.0 g | 100.0 g | 100.0 g |
| Carbilux CCLI | — | — | 13.3 g | 19.9 g | — | — | — | — |
| ROPAQUE HP-1055 | — | — | — | — | 37.7 g | 56.6 g | — | — |
| ROPAQUE HP-543 | — | — | — | — | — | — | 33.3 g | 50.0 g |

Example 2

Preparation of Test Samples

Adhesive Formulations 1, 2, 3a, 3b, 4a, 4b, 5a, and 5b were cast on 60# solvent-less release liner with a 0.001 inch Bird applicator and dried for 5 minutes at 180° F. The dried adhesive formulations were then transfer coated to 50# electronic data processing paper with a light roller.

The adhesive coated paper was then cut into 1-inch wide strips and conditioned prior to testing.

Example 3
90° Peel Adhesion Test

Peel adhesion is the force per unit width required to break the bond between a PSA and a surface when peeled back at a controlled angle at a standard rate and condition. The test samples prepared in accordance with Example 2 were subjected to the peel adhesion test at 90° using an Instron tensile tester on stainless steel (ss) and high density polyethylene (HDPE) panels using the PSTC-2 test protocol. Testing on the stainless steel panels were conducted at dwell times of 1 minute, 20 minutes, 24 hours and 1 week. Testing on the HDPE panels were conducted at dwell times of 20 minutes, 24 hours and 1 week. The results are shown in Table 3.

Example 4
Loop Tack Test

The loop tack test allows the end-user to evaluate the tack or wettability of an adhesive, giving an indication of the "quick stick" of the adhesive. The test samples prepared in accordance with Example 2 were subjected to the loop tack test using an Instron tensile tester on stainless steel (ss) and high density polyethylene (HDPE) panels using the 1994 TLMI Test L-IB2 test protocol (except that the length of the samples was adjusted to 5 inches). The results are shown in Table 3.

Example 5
Shear Adhesion Test

Shear adhesion measures the holding power of an adhesive to remain adhered under load applied parallel to the surface of the adhesive. The test samples prepared in accordance with Example 2 were subjected to the shear adhesion testing using the PSTC-7 (Procedure A) test protocol modified for a 1.0 inch wide sample, 1.0 square inch test area and 1 kg weight applied. The results are shown in Table 3.

Example 6
Opacity Test

The opacity provided by the voided latex particles of the invention was evaluated qualitatively by visually inspecting the opacity of:

(a) Adhesive Formulations 2 (control) and 4b coated on an acetate sheet to a dried thickness of 1 mil;

(b) Adhesive Formulations 3a (comparative), 3b (comparative), 5a and 5b applied to transparent film to equal dried thickness; or (c) a paper label applied to a printed substrate, wherein the paper label has the Adhesive Formulations 2 (control), 4a and 4b applied thereto.

The results are shown in Table 3.

TABLE 3

| | 1 Control | 2 Control | 3a Comparative | 3b Comparative | 4a | 4b | 5a | 5b |
|---|---|---|---|---|---|---|---|---|
| 90° Peel Adhesion (lb/in) ss: | | | | | | | | |
| 1 minute | 0.73 A trace AFB | 2.6 A/+ (1)(PF) | 2.1 A | 2.0 A | 1.8 A/+ (1)(PF) | 1.7 A/+ (1)(PF) | 1.7 A | 1.7 A |
| 20 minutes | 0.80 A | 2.3 A* −2.6 A | 2.0 A/+ (1)(PF) | 2.2 A/+ (1)(PF) | 1.8 A | 1.9 A | 1.8 A | 1.7 A |
| 24 hours | 0.91 A | 3.0 A/+ | 2.4 A | 2.5 A | 2.3 A/+ (1)(PF) | 2.0 A/+ (1)(PF) | 2.0 A | 2.0 A |
| 1 week | 0.89 A trace AFB | 2.8 A | 2.5 A | 2.5 A | 2.5 A | (2.5)** PF | 2.1 A | 1.9 A |
| HDPE | | | | | | | | |
| 20 minutes | 0.29 A | 1.4 A | 1.3 A | 1.3 A | 1.2 A | 1.3 A | 1.3 A | 1.3 A |
| 24 hours | 0.35 A | 1.6 A | 1.5 A | 1.6 A | 1.5 A | 1.6 A | 1.5 A | 1.6 A |
| 1 week | 0.08 A | 1.8 A | 1.8 A | (2.2)** PF | (2.2)** PF | (2.3)** PF | 1.8 A | (2.2)** PF |
| Loop Tack (lb/in$^2$) | | | | | | | | |
| ss | 1.7 A | 4.8 A* | 4.0 A* | 3.9 A | 1.3 A | 1.3 A | 1.3 A | 1.3 A |
| HDPE | 0.65 A | 2.6 A | 2.4 A | 2.1 A | 1.6 A | 1.7 A | 1.5 A | 1.6 A |
| Shear Adhesion (hours) | 3.7 C | 9.5 C | 21.8 C | 26.5 C | 16.8 C | 23.6 C | 17.0 C | 27.3 C |
| Opacity (visual description) | no whiteness | no whiteness | clear to slightly white | clear to slightly white | white | white | white | white |

A = adhesive failure
AFB = adhesive failure from backing
PF = paper failure
C = cohesive failure
*noisy test
**PF with peak value The addition of the voided latex particles of the invention to the Adhesive Formulation (4a, 4b, 5a, 5b) improves the opacity of the adhesive formulation relative to the controls (1, 2) and relative to the comparative (3a, 3b). The addition of the voided latex particles of the invention to the Adhesive Formulation (4a, 4b, 5a, 5b) improves the shear adhesion of the adhesive formulation without unacceptably compromising the other adhesive properties of the adhesive formulation (peel adhesion and loop tack).

I claim:

1. A method of improving an adhesive article, comprising:
   a. providing at least one paper facestock layer; and
   b. applying at least one adhesive layer to at least a portion of said paper facestock layer, wherein said adhesive layer comprises at least one pressure sensitive adhesive;

the improvement comprising:

adding to said adhesive layer, prior to application of said adhesive layer to said paper facestock layer, 1% by weight solids to 80% by weight solids, based on the weight solids of said pressure sensitive adhesive, of voided latex particles, said particles having a particle size diameter of 100 nm to 2,000 nm, a void fraction of 10% to 75%, and a glass transition temperature of at least 20° C.

2. The method of claim 1, wherein said voided latex particles have a particle size diameter of 500 nm to 1,100 nm.

3. The method of claim 1, wherein said voided latex particles are present at a level of 5% by weight solids to 50% by weight solids, based on the weight solids of said pressure sensitive adhesive.

4. The method of claim 1, wherein said voided latex particles are present at a level of 10% by weight solids to 25% by weight solids, based on the weight solids of said pressure sensitive adhesive.

5. The method of claim 1, wherein said voided latex particles have a glass transition temperature of at least 50° C.

6. The method of claim 1, wherein said voided latex particles have a single void.

7. The method of claim 1, wherein said pressure sensitive adhesive is an acrylic adhesive.

8. The method of claim l, wherein said article is tape.

9. The method of claim 1, wherein said article is a label.

10. The method of claim 1, wherein said article is repositionable paper.

* * * * *